United States Patent [19]
Gabbert

[11] Patent Number: 5,347,674
[45] Date of Patent: Sep. 20, 1994

[54] CONTACT LENS TREATMENT APPARATUS

[76] Inventor: Chuck Gabbert, 5112 Atrisco Pl. NW., Albuquerque, N. Mex. 87105-1217

[21] Appl. No.: 87,578

[22] Filed: Jul. 9, 1993

[51] Int. Cl.$^5$ .................. G02C 13/00; B08B 11/02
[52] U.S. Cl. .................. 15/97.1; 15/21.1; 15/214; 134/901
[58] Field of Search ........... 15/21.1, 97.1, 214; 134/901

[56] References Cited

FOREIGN PATENT DOCUMENTS

| 0187216 | 8/1988 | Japan | 15/97.1 |
| 0121818 | 5/1989 | Japan | 15/97.1 |
| 0123323 | 5/1990 | Japan | 15/97.1 |

Primary Examiner—Edward L. Roberts
Attorney, Agent, or Firm—Gary Alan Culliss

[57] ABSTRACT

A contact lens treatment apparatus for polishing and cleaning a pair of contact lenses. The apparatus utilizes a pair of polishing probes to clean each contact lens within a liquid bath. A motor rotates the polishing probes and a fluid reservoir supplies a solution to the lenses. The polishing probes include a cleaning solution measuring and dispensing system integrally formed therein.

3 Claims, 4 Drawing Sheets

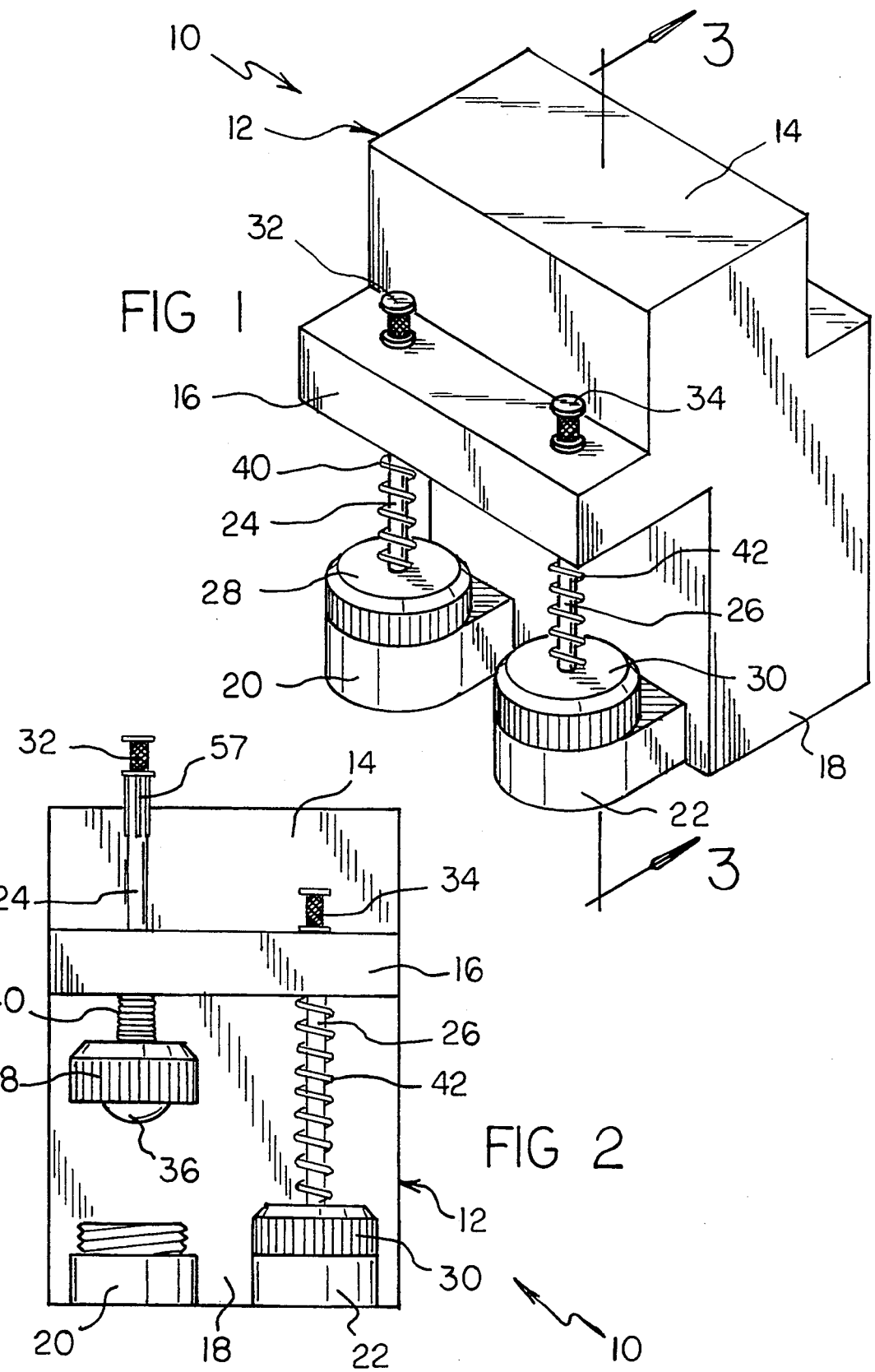

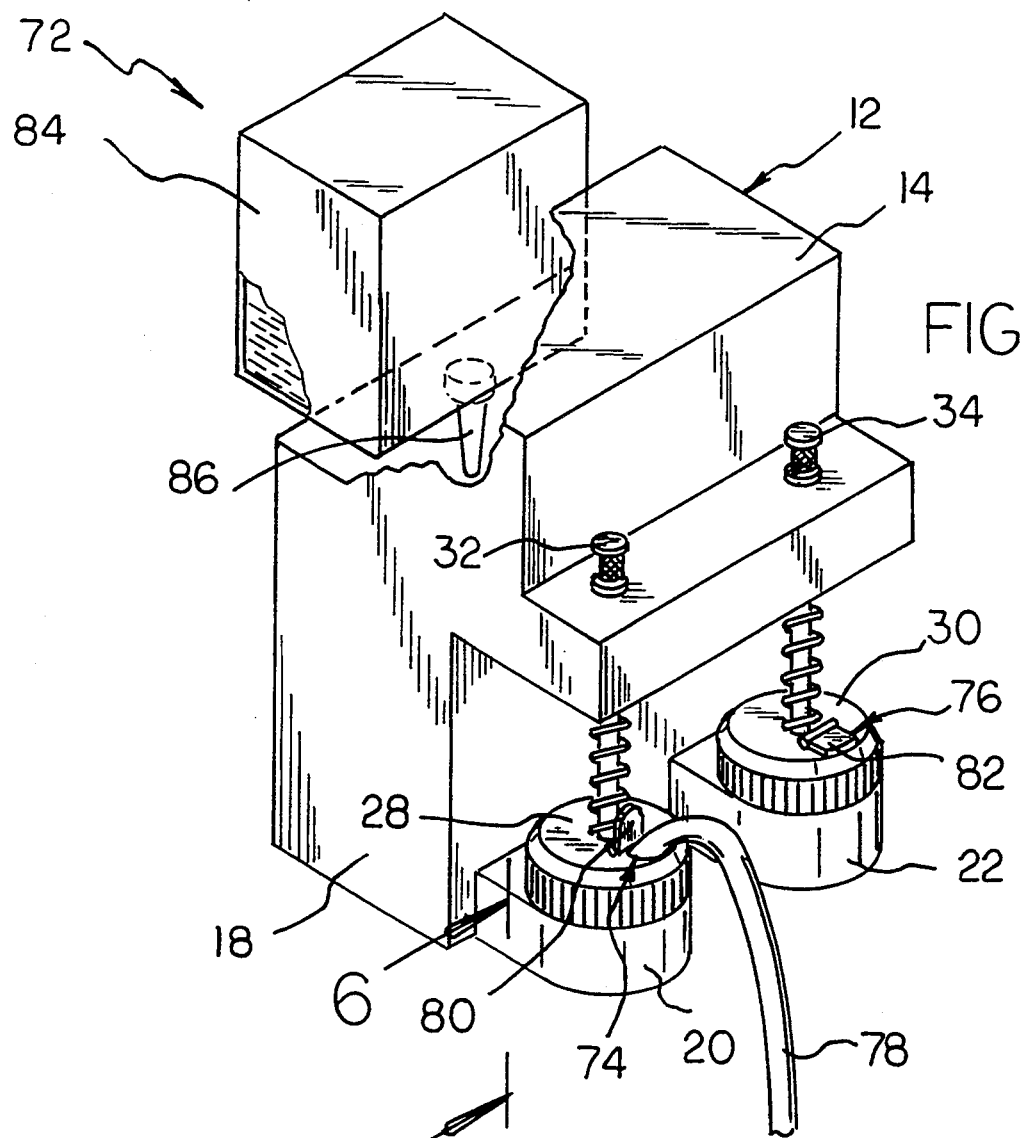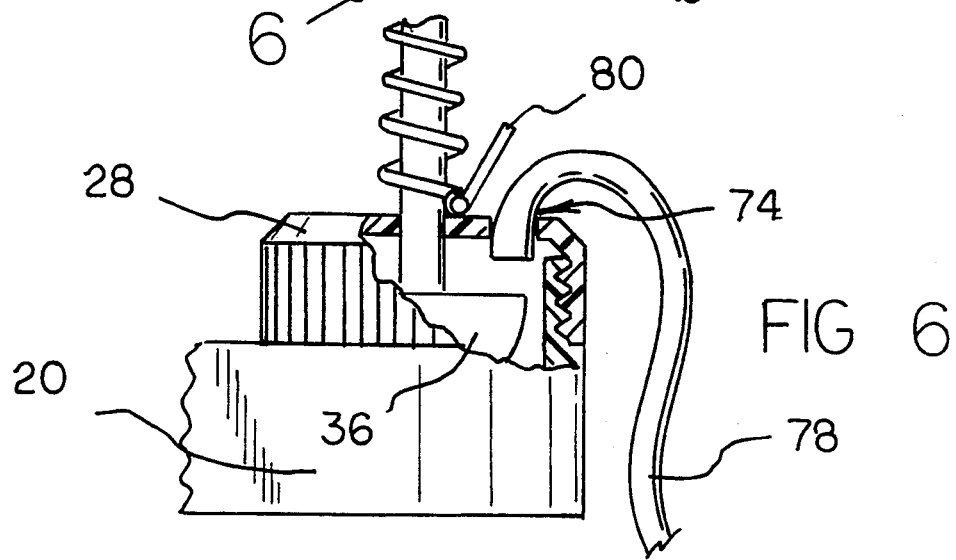

CONTACT LENS TREATMENT APPARATUS

BACKGROUND OF THE INVENTION

The present invention relates to lens polishers and more particularly pertains to contact lens treatment apparatuses which may be utilized for polishing and cleaning a pair of contact lenses.

2. Description of the Prior Art

The use of lens polishers is known in the prior art. More specifically, lens polishers heretofore devised and utilized for the purpose of polishing lenses are known to consist basically of familiar, expected and obvious structural configurations, notwithstanding the myriad of designs encompassed by the crowded prior art which have been developed for the fulfillment of countless objectives and requirements.

For example, a manually operable contact lens surface treatment apparatus is illustrated in U.S. Pat. No. 5,023,971 which may be utilized for performing such contact lens surface treatment procedures as polishing, cleaning, or lens modification.

A polishing solution recirculating system for use with a contact lens polishing machine may be seen in U.S. Pat. No. 3,782,042 wherein lenses held by separate holders are brought into contact with a wetted surface polishing element disposed on a rotating spindle.

Another patent of interest is U.S. Pat. No. 4,979,337 which discloses a polishing tool for contact lenses that comprises a base, and exteriorly convex resilient polishing head, and a polishing cloth that may be utilized by connecting it to a rotatable shaft and exposing the polishing tool to the interior of a contact lens.

While these devices fulfill their respective, particular objectives and requirements, the aforementioned patents do not describe a contact lens treatment apparatus in which an electric motor rotates a pair of polishing probes each of which includes a solution measuring and dispensing system that is integrally formed therein.

In this respect, the contact lens treatment apparatus according to the present invention substantially departs from the conventional concepts and designs of the prior art, and in so doing provides an apparatus primarily developed for the purpose of polishing and cleaning a pair of contact lenses.

SUMMARY OF THE INVENTION

In view of the foregoing disadvantages inherent in the known types of lens polishers now present in the prior art, the present invention provides a new contact lens treatment apparatus construction wherein the same can be utilized for polishing and cleaning a pair of contact lenses. As such, the general purpose of the present invention, which will be described subsequently in greater detail, is to provide a new contact lens treatment apparatus which has many of the advantages of the lens polishers mentioned heretofore and many novel features that result in a contact lens treatment apparatus which is not anticipated, rendered obvious, suggested, or even implied by any of the prior art lens polishers, either alone or in any combination thereof.

To attain this, the present invention essentially comprises a contact lens treatment apparatus for polishing and cleaning a pair of contact lenses. The apparatus utilizes a pair of polishing probes to clean each contact lens within a liquid bath. A motor rotates the polishing probes and a fluid reservoir supplies a solution to the lenses. The polishing probes include a cleaning solution measuring and dispensing system integrally formed therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new contact lens treatment apparatus which has many of the advantages of the lens polishers mentioned heretofore and many novel features that result in a contact lens treatment apparatus which is not anticipated, rendered obvious, suggested, or even implied by any of the prior art lens polishers, either alone or in any combination thereof.

It is another object of the present invention to provide a new contact lens treatment apparatus which may be easily and efficiently manufactured and marketed.

It is a further object of the present invention to provide a new contact lens treatment apparatus which is of a durable and reliable construction.

An even further object of the present invention is to provide a new contact lens treatment apparatus which is susceptible of a low cost of manufacture with regard to both materials and labor, and which accordingly is then susceptible of low prices of sale to the consuming public, thereby making such contact lens treatment apparatuses economically available to the buying public.

Still yet another object of the present invention is to provide a new contact lens treatment apparatus which provides in the apparatuses and methods of the prior art some of the advantages thereof, while simultaneously overcoming some of the disadvantages normally associated therewith.

Still another object of the present invention is to provide a new contact lens treatment apparatus which may be utilized for polishing and cleaning a pair of contact lenses.

Yet another object of the present invention is to provide a new contact lens treatment apparatus which utilizes a pair of polishing probes to clean each contact lens within a liquid bath.

Even still another object of the present invention is to provide a new contact lens treatment apparatus which utilizes a pair of polishing probes that each include a cleaning solution measuring and dispensing system integrally formed therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a contact lens treatment apparatus comprising the present invention.

FIG. 2 is a front elevation view of the present invention.

FIG. 5 is a perspective view of a second embodiment of the present invention.

FIG. 6 is a side elevation view of a portion of the present invention, partially in cross section, as seen along line 6—6 of FIG. 5.

DESCRIPTION OF THE PREFERRED EMBODIMENT

Figure 3:
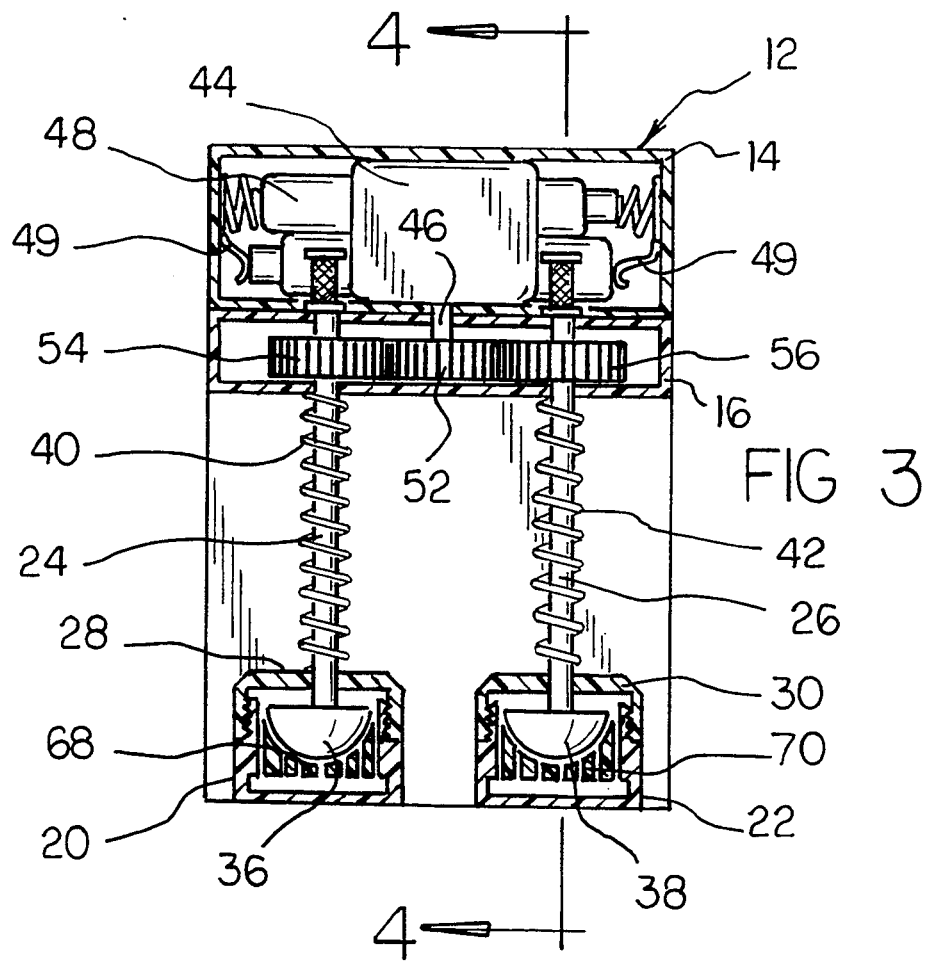
FIG. 3 is a cross section view taken along line 3—3 of FIG. 1.

With reference now to the drawings, and in particular to FIGS. 1-4 thereof, a new contact lens treatment apparatus embodying the principles and concepts of the present invention and generally designated by the reference numeral 10 will be described.

More specifically, it will be noted that the contact lens treatment apparatus 10 comprises a body assembly 12 that includes a plurality of compartments which are integrally connected together. A motor compartment 14, a gear compartment 16, and a fluid compartment 18 are all integrally or otherwise connected together to form the body assembly 12 as shown in FIG. 1. In addition, a pair of lens containers 20, 22 are also integrally connected to the body assembly 12 and are closed by a pair of caps 28, 30 which, along with the lens containers 20, 22, may be constructed of any material, including transparent materials which allow a user to view an interior of the lens containers. A pair of probe shafts 24, 26 pass through apertures in both the gear compartment 16 and the pair of caps 28, 30. Each of the pair of probe shafts 24, 26 has a knob 32, 34 located at a first end and a probe 36, 38 at a second end of each respective probe shaft. Each of the probes 36, 38 is substantially hemispherically shaped and is comprised of any material which may be utilized for cleaning and polishing contact lenses such as cloth, foam materials, and the like. The caps 28, 30 have threads located on an interior surface of each of the caps and may be threadably engaged to respective lens containers 20, 22 in a well understood manner. Each probe shaft 24, 26 further supports a coil spring 40, 42 thereon which are operable to bias each of the probes 36, 38 towards the lens containers 20, 22, respectively.

Located within the motor compartment 14 is an electric motor 44 that is mounted in a conventional manner with a motor shaft 46 projecting into the gear compartment 16. Also located within the motor compartment 14 in a juxtaposed relationship to the motor 44 is a plurality of batteries of conventional design which are operable to supply electrical power to the motor through a plurality of contacts 49. Adjacent the batteries 48 is a switch 50 which is electrically connected to the motor so that a user may operate the switch to interrupt a flow of electrical power to the motor in a well understood manner. The switch 50 is mounted to an interior wall of the motor compartment 14 in such a manner so as to allow a portion of the switch to project through an aperture (not labeled) in the motor compartment 14.

A motor gear 52 is fixedly secured to the motor shaft 46 in such a manner so as to provide a rotation of the motor gear upon a rotation of the motor shaft. The motor gear 52 is operable to engage a pair of shaft gears 54, 56 within the gear compartment 16. Each shaft gear 54, 56 contains a plurality of spline receiving journals located on an interior of the center axis. The spline receiving journals are operable to receive and engage the splines 57 that are present on each of the probe shafts 24, 26 as illustrated in FIG. 2. This arrangement allows a rotatable coupling between each of the shaft gears 54, 56 and the probe shafts 24, 26, respectively, while still allowing a sliding movement of the probe shafts.

The fluid compartment 18 includes a reservoir 58 for containing a cleaning fluid 60 therein and may also contain an unillustrated window through which a user may view a level of such cleaning fluid. The reservoir 58 is in fluid communication with both of the lens containers 20, 22, whereby the cleaning fluid 60 may travel through a channel 62 and into the lens containers. The fluid compartment 18 further comprises a hole 64 that allows for an addition of the cleaning fluid 60 or other cleaning product, such as an enzyme tablet and water, into the reservoir 58. A plug 66 may be removably secured within the hole 64 to contain the cleaning fluid 60 therein.

Figure 4:
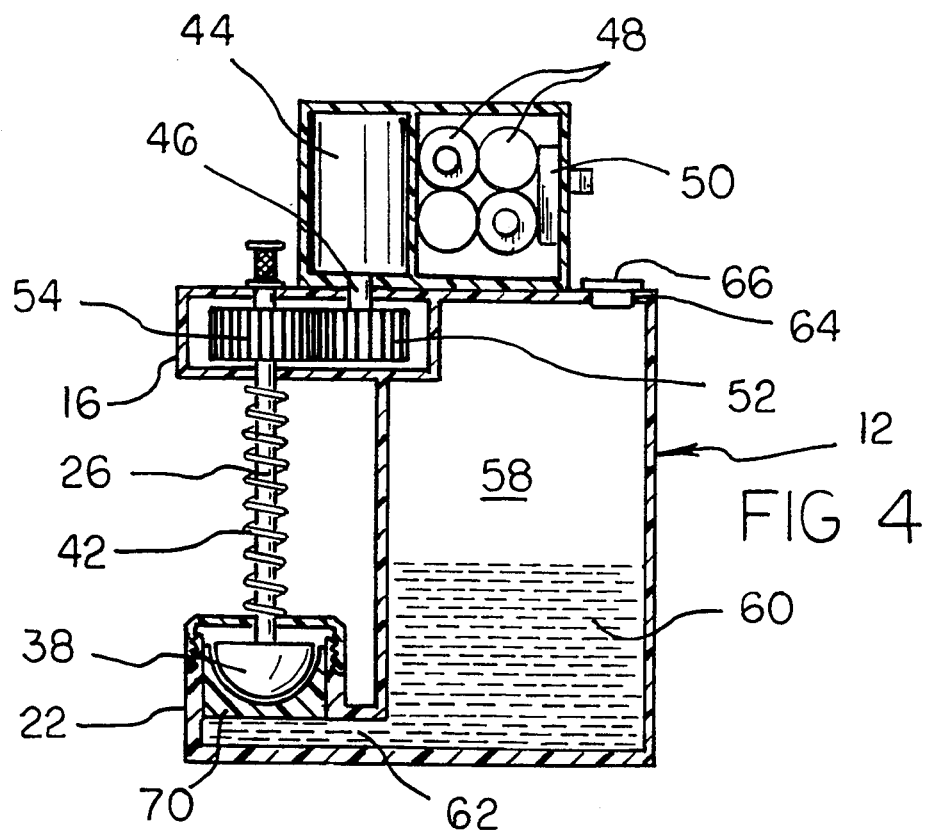
FIG. 4 is a cross section view taken along line 4—4 of FIG. 3.

The contact lens treatment apparatus 10 may be utilized by placing each of a pair of contact lenses within each of the lens containers 20, 22. The contact lenses, when placed within the lens containers 20, 22 will reside upon respective lens rests 68, 70 within each of the lens containers, as best shown in FIGS. 3-4. The caps 28, 30 can then be used to seal their respective lens containers 20, 22 so as to prevent an escape of the cleaning fluid 60 therefrom. The reservoir 58 may then be filled with cleaning fluid 60 through the hole 64 in the fluid compartment 18. The motor may then be energized by an actuation of the switch 50 by a user. Upon an energization of the motor 44, the probe shafts 24, 26 will rotate their respective probes 36, 38 which will polish the lenses placed between the probes and the lens rests 68, 70. An unillustrated timer, also in electrical communication with the motor 44, may be selectively operated in a well understood manner to de-energize the motor after a predetermined amount of time has elapsed. Each contact lens may then be removed from the invention 10 by a use of a user's fingers, or alternatively, a contact lens applicator of conventional design may be utilized.

A second embodiment of the present invention which comprises substantially all of the features of the foregoing embodiment 10, and which is generally designated by the reference numeral 72, can be seen in FIGS. 5–6. The second embodiment 72 further comprises a pair of drains 74, 76 that are located on respective caps 28, 30 of the lens containers 20, 22. The drains 74, 76 are operable to allow cleaning fluid 60 to be expelled from each of the lens containers 20, 22, respectively. A drain tube 78 may be inserted into the drains 74, 76 to direct an exit of cleaning fluid 60 therefrom. The drains 74, 76 may be releasably sealed by a pair of closures 80, 82 located on the respective caps 28, 30, as illustrated in FIG. 5.

The drains 74, 76 are useful to allow a user to rinse the contact lenses within the lens containers 20, 22 without touching the lenses. An additional reservoir 84 is equipped with a nozzle 86 that allows fluid 60 contained within the additional reservoir to replenish any of the fluid in the reservoir 58 that may exit through the drains 74, 76.

Figure 7:
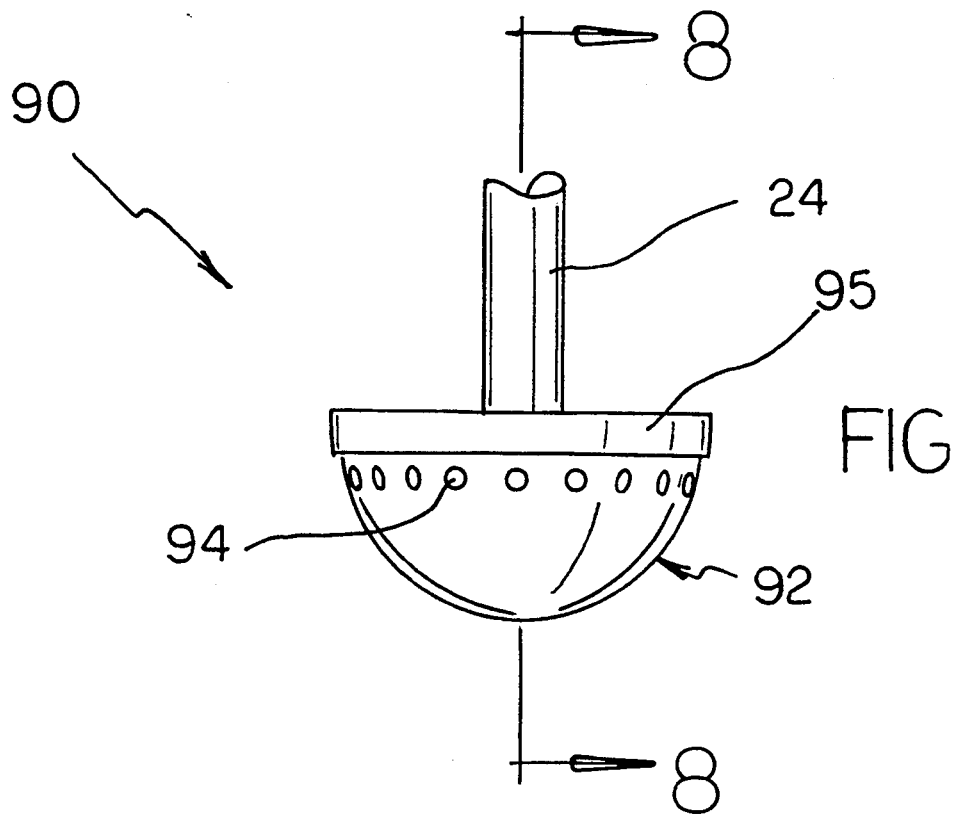
FIG. 7 is a side elevation view of a portion of a third embodiment of the present invention.
Figure 8:
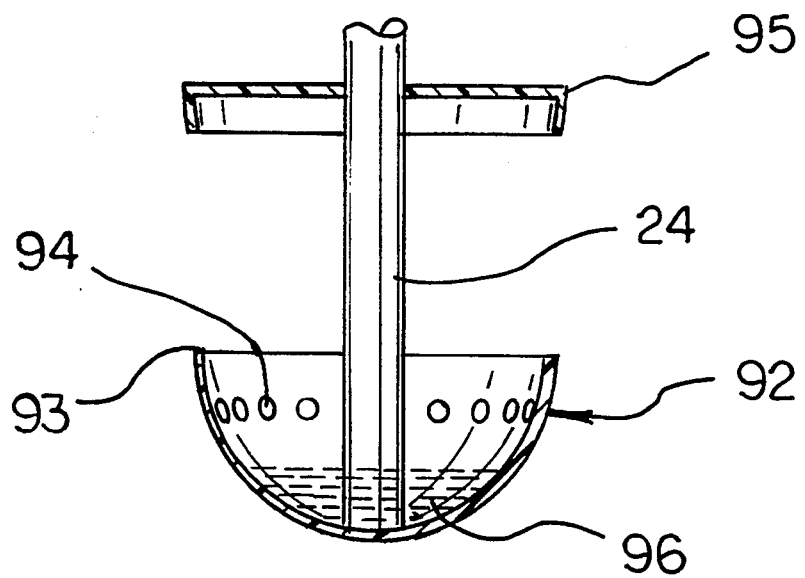
FIG. 8 is a cross section view taken along line 8—8 of FIG. 7.

Comprising all of the features and structure of the previous embodiments 10, 72 is a third embodiment which is generally designated by the reference numeral 90 and may be viewed in FIGS. 7–8. It can be shown that the third embodiment 90 further comprises a dispensing probe 92 which is substantially hemispherical shaped and which includes a plurality of dispensing holes 94 located proximate a perimeter edge 93 of the dispensing probe. The dispensing probe 92 further includes a probe cover 95 which covers and frictionally engages an open area of the dispensing probe 92. A solution 96 may be placed within the dispensing probe 92 and contained therein by the probe cover 94. Upon a rotation of the probe shaft 24, the solution 96 may be biased by centrifugal forces through the dispensing holes 94, thus applying the solution to a contact lens located therebeneath.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A contact lens treatment apparatus comprising:
   a body assembly having a motor compartment, a gear compartment, a fluid compartment, and at least one lens container, said at least one lens container being operable to support and enclose a contact lens, said at least one lens container being in fluid communication with said fluid compartment;
   an electric motor mounted within said motor compartment, said electric motor having a motor shaft that partially projects through an aperture in said body assembly into said gear compartment;
   a power supply means electrically connected to said electric motor for supplying electrical power to said electric motor;
   at least one cap removably coupled to said at least one lens container, said cap having a shaft aperture extending therethrough;
   at least one shaft having a first end and a second end, with said first end projecting at least partially into said gear compartment and said second end projecting through said shaft aperture in said cap and at least partially into said at least one lens container;
   a motor gear attached to said motor shaft;
   at least one gear slidably mounted to said first end of said at least one shaft, said at least one gear being mechanically engaged to said motor gear, whereby said shaft is slidably displaced relative to said at least one gear upon a removal of said cap to facilitate ingress and egress of said contact lens relative to said at least one lens container; and,
   at least one probe means attached to said second end of said at least one shaft, whereby said at least one probe means is rotated by said shaft to engage said contact lens placed within said at least one lens container for performing a surface treatment procedure.

2. A contact lens treatment apparatus comprising:
   a body assembly having a motor compartment, a gear compartment, a fluid compartment, and at least one lens container, said at least one lens container being operable to support and enclose a contact lens, said at least one lens container being in fluid communication with said fluid compartment;
   an electric motor mounted within said motor compartment, said electric motor having a motor shaft that partially projects through an aperture in said body assembly into said gear compartment;
   a power supply means electrically connected to said electric motor for supplying electrical power to said electric motor;
   at least one cap removably coupled to said at least one lens container, said cap having a shaft aperture extending therethrough;
   at least one shaft having a first end and a second end, with said first end projecting at least partially into said gear compartment and said second end projecting through said shaft aperture in said cap and at least partially into said at least one lens container;
   a motor gear attached to said motor shaft;

at least one gear slidably mounted to said first end of said at least one shaft, said at least one gear being mechanically engaged to said motor gear, whereby said shaft is slidably displaced relative to said at least one gear upon a removal of said cap to facilitate ingress and egress of said contact lens relative to said at least one lens container;

at least one probe means attached to said second end of said at least one shaft, whereby said at least one probe means is rotated by said shaft to engage said contact lens laced within said at least one lens container for performing a surface treatment procedure; and, at least one drain assembly operably coupled to said at least one cap, and at least one closure connected to said at least one cap for selectively sealing said at least one drain.

3. A contact lens treatment apparatus comprising:

a body assembly having a motor compartment, a gear compartment, a fluid compartment, and at least one lens container, said at least one lens container being operable to support and enclose a contact lens, said at least one lens container being in fluid communication with said fluid compartment;

an electric motor mounted within said motor compartment, said electric motor having a motor shaft that partially projects through an aperture in said body assembly into said gear compartment;

a power supply means electrically connected to said electric motor for supplying electrical power to said electric motor;

at least one cap removably coupled to said at least one lens container, said cap having a shaft aperture extending therethrough;

at least one shaft having a first end and a second end, with said first end projecting at least partially into said gear compartment and said second end projecting through said shaft aperture in said cap and at least partially into said at least one lens container;

a motor gear attached to said motor shaft;

at least one gear slidably mounted to said first end of said at least one shaft, said at least one gear being mechanically engaged to said motor gear, whereby said shaft is slidably displaced relative to said at least one gear upon a removal of said cap to facilitate ingress and egress of said contact lens relative to said at least one lens container;

at least one probe means attached to said second end of said at least one shaft, whereby said at least one probe means is rotated by said shaft to engage said contact lens placed within said at least one lens container for performing a surface treatment procedure, whereby said at least one probe means comprises a substantially hemispherically shaped member, said hemispherically shaped member being substantially hollow and having at least one dispensing hole extending therethrough.

* * * * *